United States Patent
Kago et al.

(10) Patent No.: US 12,384,000 B2
(45) Date of Patent: Aug. 12, 2025

(54) MACHINE TOOL

(71) Applicant: DMG MORI CO., LTD., Nara (JP)

(72) Inventors: Shinji Kago, Nara (JP); Toyotada Tanaka, Nara (JP)

(73) Assignee: DMG MORI CO., LTD., Nara (JP)

( * ) Notice: Subject to any disclaimer, the term of this patent is extended or adjusted under 35 U.S.C. 154(b) by 618 days.

(21) Appl. No.: 17/783,914

(22) PCT Filed: Sep. 28, 2020

(86) PCT No.: PCT/JP2020/036536
§ 371 (c)(1),
(2) Date: Jun. 9, 2022

(87) PCT Pub. No.: WO2021/117318
PCT Pub. Date: Jun. 17, 2021

(65) Prior Publication Data
US 2023/0001533 A1 Jan. 5, 2023

(30) Foreign Application Priority Data
Dec. 9, 2019 (CN) .......................... 201911252188.8

(51) Int. Cl.
*B24B 19/26* (2006.01)
*B24B 37/025* (2012.01)
(Continued)

(52) U.S. Cl.
CPC ............ *B24B 19/26* (2013.01); *B24B 37/025* (2013.01); *B24B 37/34* (2013.01); *B24B 41/02* (2013.01);
(Continued)

(58) Field of Classification Search
CPC .............. B24B 41/005; B24B 41/0061; B24B 27/0084; B24B 27/04; B24B 19/009; B24B 19/006; B24B 5/40
See application file for complete search history.

(56) References Cited

U.S. PATENT DOCUMENTS 3,135,071 A * 6/1964 Godar ................ B24B 27/0092
451/340
3,492,764 A * 2/1970 Dalton ................ B24B 13/043
451/42
(Continued)

FOREIGN PATENT DOCUMENTS

GB 1121913 A 7/1968
JP H0647654 A 2/1994
(Continued)

OTHER PUBLICATIONS

European Search Report related to Application No. 20898124.1; reported on Nov. 23, 2023.
(Continued)

*Primary Examiner* — Joel D Crandall
(74) *Attorney, Agent, or Firm* — von Briesen & Roper, s.c.

(57) ABSTRACT

A machine tool includes a workpiece spindle unit (15) including a workpiece spindle (17) and a workpiece spindle motor (20) and includes a tool spindle unit (25) including a tool spindle (27) and a tool spindle motor. The machine tool further includes a first-axis movement mechanism (6) and a second-axis movement mechanism (9) relatively moving, in a plane including an axis of the workpiece spindle (17) and an axis of the tool spindle (27), the workpiece spindle unit (15) and the tool spindle unit (25) in a first axis direction and a second axis direction intersecting the first axis direction, respectively, and further includes a controller. The tool spindle unit (25) is arranged such that the axis of the tool
(Continued)

spindle (27) intersects the axis of the workpiece spindle (17). The controller relatively moves the workpiece spindle unit (15) and the tool spindle unit (25) along the axis of the tool spindle (27) through combined operation of the first-axis movement mechanism (6) and second-axis movement mechanism (9), thereby grinding a workpiece (W) with a cup grindstone (T).

9 Claims, 5 Drawing Sheets

(51) Int. Cl.
  *B24B 37/34* (2012.01)
  *B24B 41/02* (2006.01)
  *B24B 41/04* (2006.01)
  *B24B 51/00* (2006.01)
  *B24B 55/02* (2006.01)
(52) U.S. Cl.
  CPC .............. *B24B 41/04* (2013.01); *B24B 51/00* (2013.01); *B24B 55/02* (2013.01)

(56) References Cited

U.S. PATENT DOCUMENTS

| | | | | |
|---|---|---|---|---|
| 3,877,177 | A | * | 4/1975 | Taniguchi ............... B24B 13/00 451/159 |
| 4,662,122 | A | | 5/1987 | Ohmura et al. |
| 4,760,672 | A | * | 8/1988 | Darcangelo ........... B24B 13/043 451/232 |
| 4,768,308 | A | * | 9/1988 | Atkinson, III ........ B24B 13/043 451/5 |
| 5,024,024 | A | * | 6/1991 | Watanabe ............... B24B 13/00 451/42 |
| 5,044,125 | A | * | 9/1991 | Lambert, Jr. ........... B24B 49/16 451/72 |
| 5,417,130 | A | * | 5/1995 | Dorsch ..................... B23B 1/00 82/12 |
| 2002/0034926 | A1 | | 3/2002 | Yasuie et al. |

FOREIGN PATENT DOCUMENTS

| | | |
|---|---|---|
| JP | H08108364 A | 4/1996 |
| JP | 2000280168 A | 10/2000 |
| JP | 2002178252 A | 6/2002 |
| JP | 2003127060 A | 5/2003 |
| JP | 2003340704 A | 12/2003 |
| JP | 2005262385 A | 9/2005 |
| JP | 2005342851 A | 12/2005 |
| JP | 2006289566 A | 10/2006 |
| JP | 2009095973 A | 5/2009 |
| JP | 2012030311 A | 2/2012 |
| JP | 2012240176 A | 12/2012 |
| JP | 2012240177 A | 12/2012 |
| JP | 2015229214 A | 12/2015 |
| JP | 2017124460 A | 7/2017 |
| JP | 2017154240 A | 9/2017 |
| WO | 2016162979 A1 | 10/2016 |

OTHER PUBLICATIONS

First Chinese Office Action related to Application No. CN20191125188. 8; reported on Dec. 5, 2023.
International Search Report for related Application No. PCT/JP2020/ 036536; report dated Dec. 1, 2020.
Second Chinese Office Action related to Application No. CN20191125188.8; reported on Apr. 27, 2024.

* cited by examiner

FIG. 2

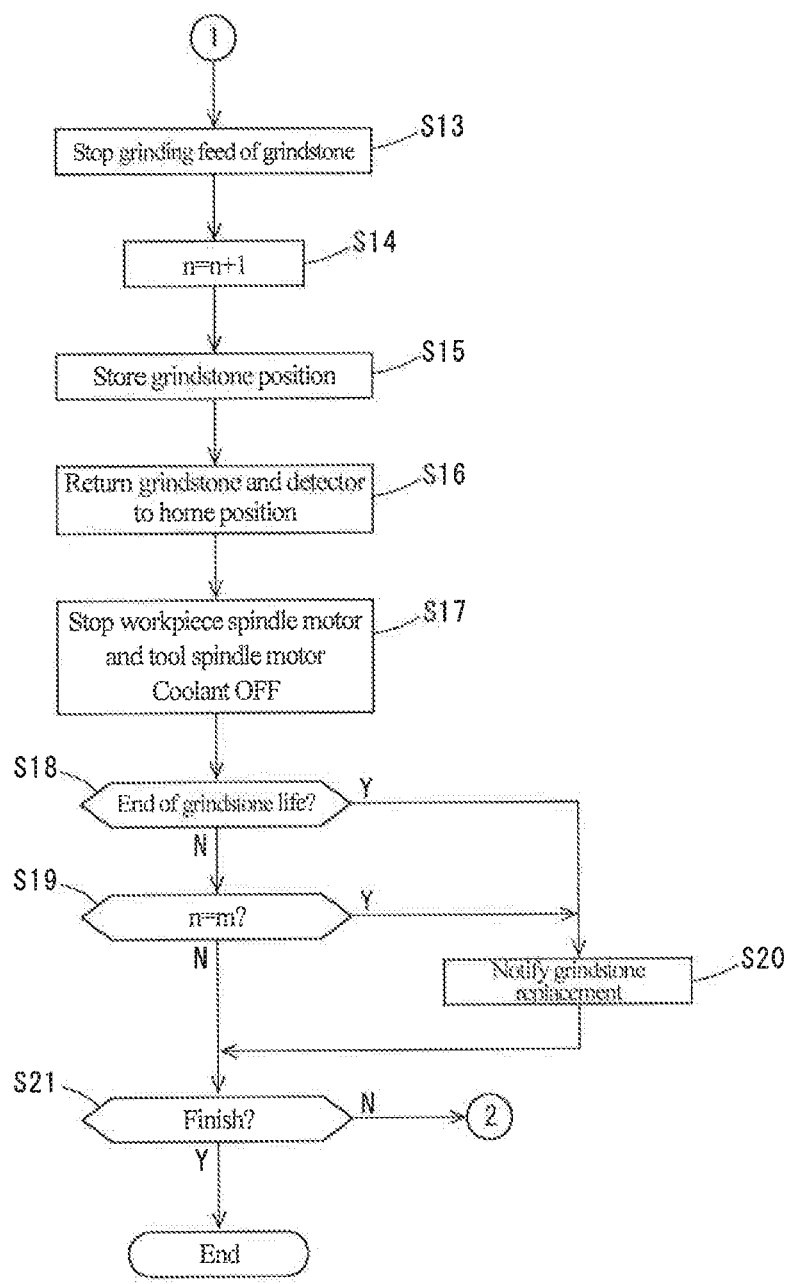

MACHINE TOOL

TECHNICAL FIELD

The present invention relates to a machine tool for grinding an outer surface of a spherical object.

BACKGROUND ART

Some workpieces have a convex spherical surface on a distal end of a shaft body thereof, such as a ball shaft for a ball joint. A known example of a machine tool for grinding the convex spherical surface of such a workpiece is the honing machine disclosed in Japanese Unexamined Patent Application publication No. 2015-229214.

As disclosed, this honing machine machines a curved or spherical surface of a workpiece and includes a workpiece rotation mechanism for rotating the workpiece and a grindstone rotation mechanism for rotating a grindstone. In this honing machine, the grindstone rotation mechanism includes a turret rotation disk having grindstones attached on the outer periphery thereof, a single grindstone driving means rotating a shaft of each grindstone, and an uncoupling means uncoupling grindstone rotating shafts and a shaft of the grindstone driving means. The honing machine is configured to switch the grindstone rotating shafts through the uncoupling means for driving.

The honing machine incudes a horizontal swing mechanism for swinging the turret rotation disk in the rotating direction and the direction opposite to the rotating direction with respect to the workpiece supported by the workpiece rotation mechanism. Further, the workpiece rotation mechanism includes a vertical swing mechanism for swinging the workpiece vertically and a horizontal swing mechanism for swinging the workpiece horizontally.

In grinding the curved surface of the workpiece, the curved surface of the workpiece is grinded by swinging the turret rotation disk vertically through a vertical swing mechanism of the grindstone rotation mechanism and/or swinging the turret rotation disk horizontally through the horizontal swing mechanism with respect to the workpiece supported horizontally by the workpiece rotation mechanism.

CITATION LIST

Patent Literature

Patent Literature 1: Japanese Unexamined Patent Application Publication No. 2015-229214

SUMMARY OF INVENTION

Technical Problem

The above-described honing machine is a dedicated machine tool that has a complicated structure specially developed for grinding a curved surface of a workpiece; therefore, the honing machine is very expensive. Accordingly, if the product to be machined is small in production quantity, the equipment cost to order volume will be excessive, which leads to significantly high manufacturing cost. Further, the mechanical operation of the honing machine is also complicated because of its complicated structure; therefore, the honing machine cannot always provide efficient machining.

The present invention has been achieved in view of the above-described circumstances, and an object of the invention is to provide a machine tool which is capable of efficiently grinding a convex spherical surface of a workpiece by a relatively simple configuration.

Solution to Problem

To solve the above-described problems, the present invention provides a machine tool including:
  a workpiece spindle unit including a workpiece spindle and a workpiece spindle motor, the workpiece spindle being rotatably held and configured to hold a workpiece, the workpiece spindle motor being configured to rotate the workpiece spindle;
  a tool spindle unit including a tool spindle and a tool spindle motor, the tool spindle being rotatably held and configured to hold a cup grindstone having a concave surface, the tool spindle motor being configured to rotate the tool spindle;
  a first-axis movement mechanism and a second-axis movement mechanism configured to relatively move, in a plane including an axis of the workpiece spindle and an axis of the tool spindle, the workpiece spindle unit and the tool spindle unit in a direction of a first axis and a direction of a second axis intersecting the first axis, respectively; and
  a controller configured to control the workpiece spindle motor, the tool spindle motor, the first-axis movement mechanism, and the second-axis movement mechanism, wherein:
  the first-axis movement mechanism includes a first-axis drive motor;
  the second-axis movement mechanism includes a second-axis drive motor;
  the tool spindle unit is arranged such that the axis of the tool spindle intersects the axis of the workpiece spindle; and
  the controller is configured to drive the first-axis movement mechanism and the second-axis movement mechanism to relatively move the workpiece spindle unit and the tool spindle unit along the axis of the tool spindle through combined operation of the first-axis movement mechanism and second-axis movement mechanism, thereby grinding the workpiece held by the workpiece spindle with the cup grindstone held by the tool spindle.

This machine tool consists of the bare minimum of components required to grind a convex spherical surface of a workpiece, i.e., the workpiece spindle unit, the tool spindle unit, the first-axis movement mechanism, the second-axis movement mechanism, and the controller controlling them. Therefore, this machine tool can be produced at a low cost; consequently, even when the product to be machined is small in production quantity, the equipment cost to order volume can be suppressed and the product can therefore be manufactured at an appropriate cost.

In this machine tool, as described above, the controller drives the first-axis movement mechanism and the second-axis movement mechanism to relatively move the workpiece spindle unit and the tool spindle unit along the axis of the tool spindle through combined operation of the first-axis movement mechanism and second-axis movement mechanism, whereby the workpiece held by the workpiece spindle is grinded by the cup grindstone held by the tool spindle. Thus, this machine tool grinds a workpiece by a very simple mechanical operation; therefore, this machine tool is capable of providing more efficient machining than the above-described conventional honing machine.

The machine tool according to the present invention may have a configuration in which:

the controller is configured to drive at least one of the first-axis movement mechanism and second-axis movement mechanism to relatively move the workpiece spindle unit and the tool spindle unit at a rapid feed rate such that the cup grindstone is positioned at an approach position set at a position prior to the cup grindstone coming into contact with the workpiece, and then drive both the first-axis movement mechanism and the second-axis movement mechanism to relatively move the workpiece spindle unit and the tool spindle unit at a grinding feed rate set for grinding; and the controller is further configured to monitor a load on at least one of the workpiece spindle motor, tool spindle motor, first-axis drive motor, and second-axis drive motor to detect the cup grindstone coming into contact with the workpiece and configured to revise the approach position to a position which is located prior to and spaced a preset distance from a detected contact position between the cup grindstone and the workpiece.

In this machine tool, for example, when starting grinding with a new cup grindstone attached to the tool spindle, the position of the grinding acting surface of the cup grindstone is not accurately recognized; therefore, the approach position for the first-time grinding is set at a safe position which is sufficiently spaced away. In the first-time grinding, the position of contact between the cup grindstone and the workpiece is recognized through monitoring of a load on at least one of the workpiece spindle motor, tool spindle motor, first-axis drive motor, and second-axis drive motor, and, based on the recognized position, the approach position is revised to a position shifted as much as possible to the workpiece side. Thereafter, in and after the second-time machining, the cup grindstone is first moved at a rapid feed rate to the approach position shifted as much as possible to the workpiece side, and then grinding is performed at a grinding feed rate; therefore, the grinding is performed efficiently in a shorter machining time.

Furthermore, the machine tool according to the present invention may have a configuration in which:

the machine tool further includes a detector configured to detect an outer diameter of the workpiece reaching a predetermined dimension during grinding of the workpiece;

the controller is configured to finish the grinding when the detector detects the outer diameter of the workpiece reaching the predetermined dimension and configured to store as a machining completion position a relative positional relation between the cup grindstone and the workpiece at time of detection; and the controller is further configured to, in machining a plurality of workpieces with the cup grindstone, compare a machining completion position obtained in machining of a current workpiece with a machining completion position obtained in machining of an initial workpiece, and when an amount of variation between the machining completion positions exceeds a predetermined limit amount, judge that the cup grindstone has reached an end of its life and make a notification to outside.

In the machine tool having this configuration, a relative positional relation between the cup grindstone and the workpiece obtained at the time when completion of machining is detected by the detector is stored as a machining completion position. Further, in machining a plurality of workpieces, the machining completion position detected in each machining is compared with the initially detected machining completion position and an amount of variation between them is calculated. This amount of variation is equivalent to an amount of wear of the cup grindstone. Therefore, when the amount of variation, i.e., the amount of wear, exceeds a predetermined limit amount, the cup grindstone is judged to have reached the end of its life and a notification is made to the outside. Since the notification that the cup grindstone has reached the end of its life is made to the outside, it is possible to replace the cup grindstone having reached the end of its life with a new one at an appropriate time. By replacing the cup grindstone appropriately in this manner, the grinding acting part of the cup grindstone, which performs machining on the workpieces, is kept in a suitable condition, so that the accuracy in machining the workpieces is suitably maintained.

Furthermore, the machine tool according to the present invention may have a configuration in which:

the cup grindstone has a through hole formed to penetrate the cup grindstone along an axis of the cup grindstone;

the tool spindle has a supply hole communicating with the through hole of the cup grindstone held by the tool spindle; and the machine tool further includes a coolant supply mechanism configured to supply coolant to the supply hole of the tool spindle to discharge the coolant through an opening of the through hole formed in the cup grindstone.

In typical grinding, coolant is supplied to the grinding acting part to cool the workpiece and prevent clogging of the grindstone. However, in grinding using a cup grindstone, these effects cannot be expected because coolant sprayed from the outside hardly reaches the inside of the grinding acting part. With the machine tool having the above-described configuration, since the coolant supply mechanism is provided such that coolant is discharged through the opening of the through hole formed in the cup grindstone, coolant spreads all over the grinding acting part; therefore, the above-mentioned cooling effect and clogging prevention effect are sufficiently obtained.

Advantageous Effects of Invention

The machine tool according to the present invention consists of the bare minimum of components required to grind a convex spherical surface of a workpiece, i.e., the workpiece spindle unit, the tool spindle unit, the first-axis movement mechanism, the second-axis movement mechanism, and the controller controlling them. Therefore, this machine tool can be produced at a low cost; consequently, even when the product to be machined is small in production quantity, the equipment cost to order volume can be suppressed and the product can therefore be manufactured at an appropriate cost.

Further, this machine tool grinds a workpiece by the very simple mechanical operation, that is, by driving the first-axis movement mechanism and the second-axis movement mechanism through the controller so as to relatively move the workpiece spindle unit and the tool spindle unit along the axis of the tool spindle through combined operation of the first-axis movement mechanism and second-axis movement mechanism. Therefore, this machine tool is capable of providing more efficient machining than the above-described conventional honing machine.

BRIEF DESCRIPTION OF DRAWINGS

FIG. 2 is a partially cutaway front view of a spindle unit in the embodiment;
FIG. 5 is a flowchart illustrating the process in the controller in the embodiment.

DESCRIPTION OF EMBODIMENTS

Figure 1:
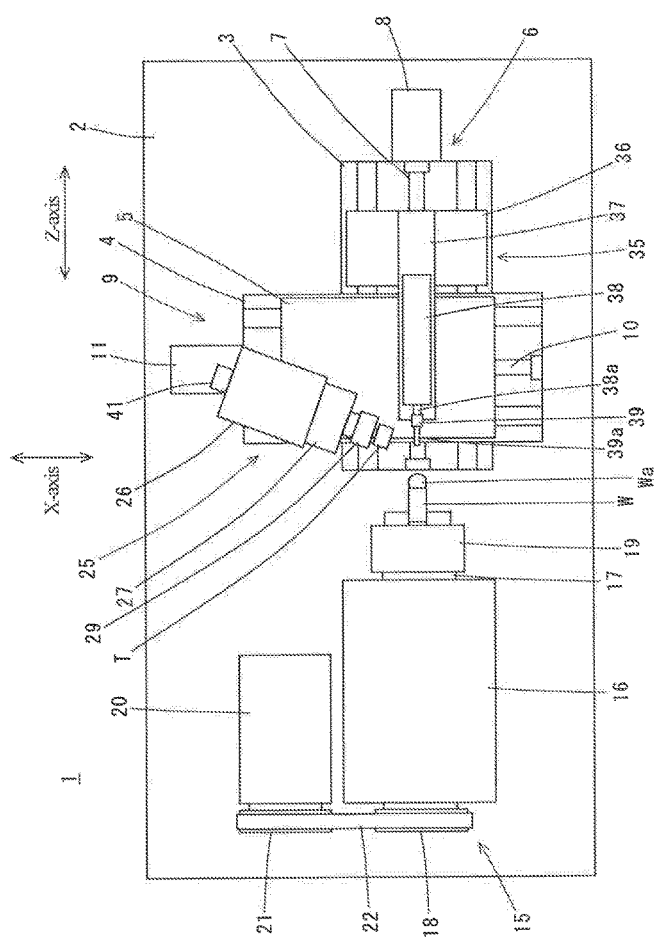
FIG. 1 is a plan view of a machine tool according to an embodiment of the present invention.
Figure 2:
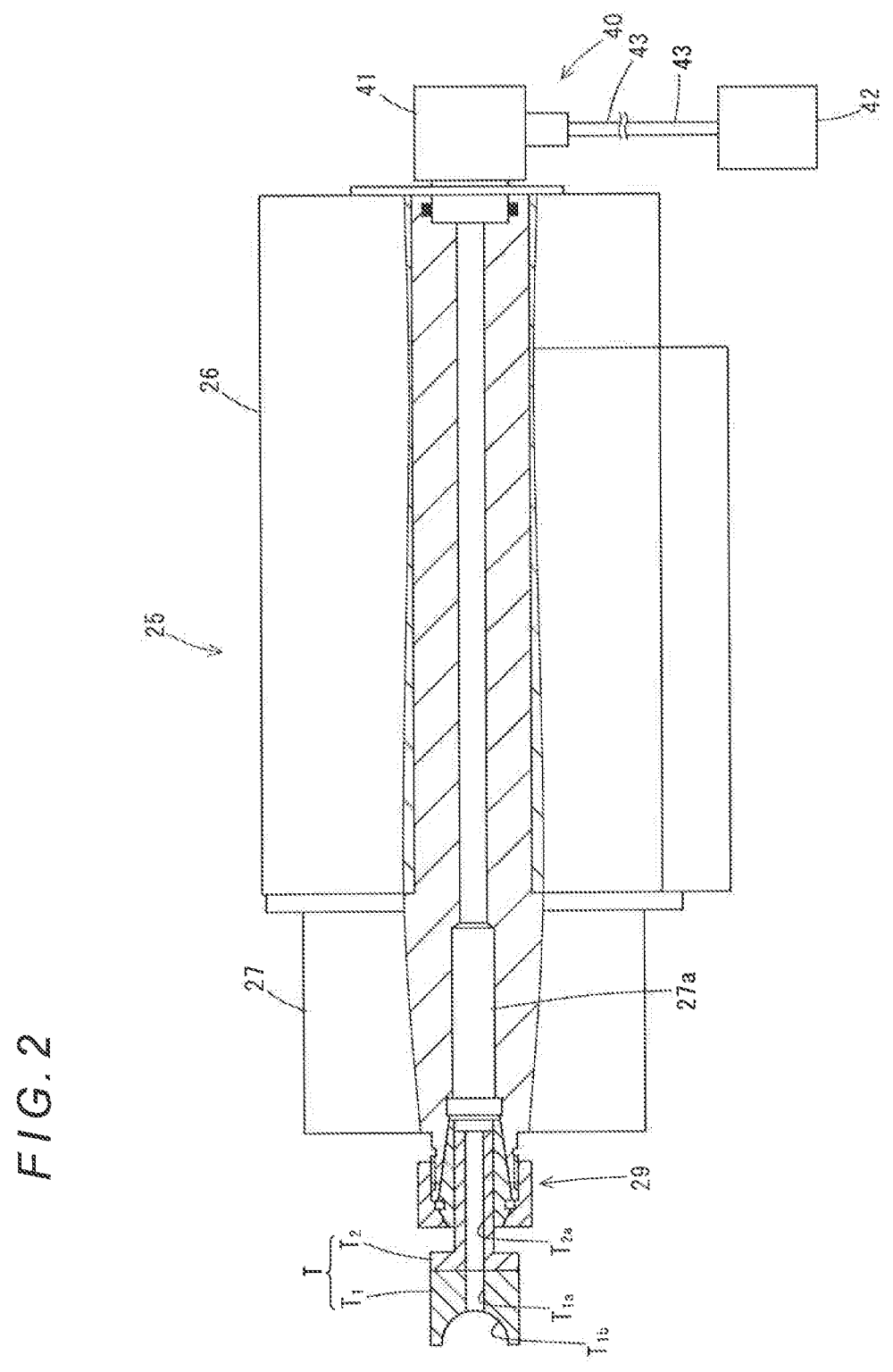
Figure 3:
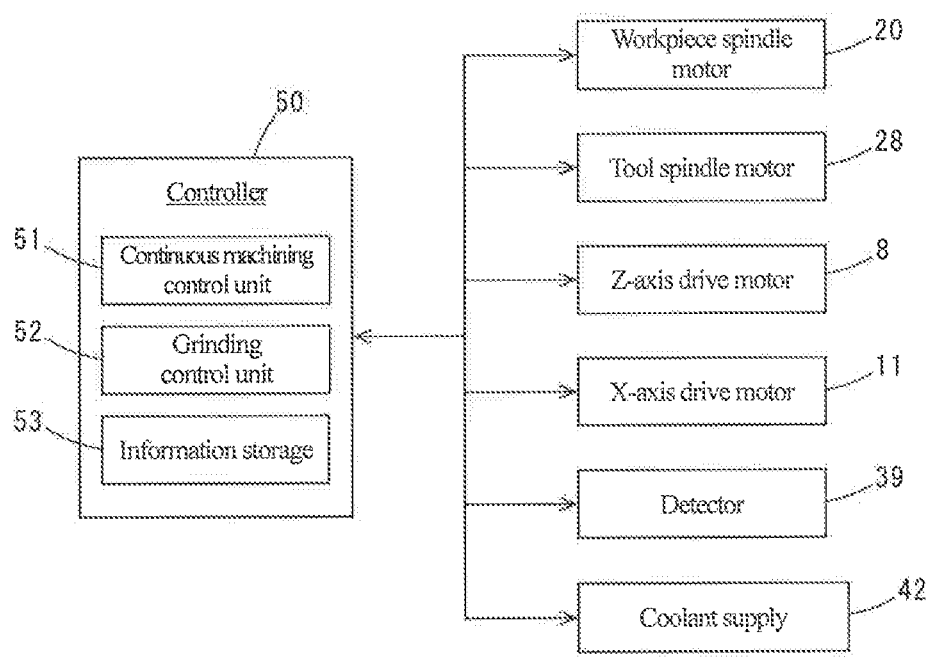
FIG. 3 is a block diagram illustrating a control-relevant configuration in the embodiment.

Hereinafter, a specific embodiment of the present invention will be described with reference to the drawings.
As illustrated in FIGS. 1 to 3, a machine tool 1 according to this embodiment includes a bed 2, a guide board 3 and a workpiece spindle unit 15 arranged on the bed 2, a carriage 4 and a detection unit 35 arranged on the guide board 3, a table 5 arranged on the carriage 4, a tool spindle unit 25 arranged on the table 5, a Z-axis movement mechanism 6, an X-axis movement mechanism 9, a coolant supply mechanism 40, and a controller 50.
Note that the object to be grinded by the machine tool 1 is an axial workpiece W having a spherical portion Wa on a distal end thereof. Note further that the bed 2, guide board 3, workpiece spindle unit 15, carriage 4, table 5, Z-axis movement mechanism 6, and X-axis movement mechanism 9 of the machine tool 1 are configured similarly to those of a typical general-purpose NC machine tool. These components are described below.
As illustrated in FIG. 1, the workpiece spindle unit 15 is arranged on the left part of the bed 2. The workpiece spindle unit 15 includes a workpiece headstock 16, a workpiece spindle 17 rotatably supported by the spindle headstock 16, a chuck 19 attached to the right end of the workpiece spindle 17, and a workpiece spindle motor 20 arranged side by side with the workpiece headstock 16. The workpiece spindle 17 has a pulley 18 attached to the end thereof, and the workpiece spindle motor 20 also has a pulley 21 attached to an output shaft on the left end thereof. Around the pulleys 18 and 21, a transmission belt 22 is looped. Thus, a rotational driving force of the workpiece spindle motor 20 is transmitted to the workpiece spindle 17 through the pulley 21, the transmission belt 22, and the pulley 18, so that the workpiece spindle 17 as well as the chuck 19 rotate about the axis thereof. Further, as illustrated in FIG. 1, the workpiece W is clamped by the chuck 19 with the spherical portion Wa positioned on the right side.
The guide board 3 is arranged on the right side of the workpiece spindle unit 15 such that the longitudinal direction of the guide board 3 extends along the axis of the workpiece spindle 17. The guide board 3 guides the carriage 4 in a direction of Z-axis that extends along the axis of the workpiece spindle 17. The table 5 is arranged on the carriage 4 and is moved in a direction of X-axis, which extends perpendicularly to the Z-axis, by a guide unit provided on the carriage 4.
The Z-axis movement mechanism 6 consists of a ball screw 7 extending along the Z-axis and rotatably arranged on the guide board 3, a ball nut (not illustrated) screwed on the ball screw 7 and fixed on a lower surface of the carriage 4, and a Z-axis drive motor 8 connected to an end of the ball screw 7 to cause the ball screw 7 to rotate about the axis thereof. When the ball screw 7 is rotated about the axis thereof by the Z-axis drive motor 8, the carriage 4 moves in the Z-axis direction in accordance with the screwing between the ball screw 7 and the ball nut (not illustrated) screwed on the ball screw 7.

The X-axis movement mechanism 9 consists of a ball screw 10 extending along the X-axis and rotatably arranged on the carriage 4, a ball nut (not illustrated) screwed on the ball screw 10 and fixed on a lower surface of the table 5, and an X-axis drive motor 11 connected to an end of the ball screw 10 to cause the ball screw 10 to rotate about the axis thereof. When the ball screw 10 is rotated about the axis thereof by the X-axis drive motor 11, the table 5 moves in the X-axis direction in accordance with the screwing between the ball screw 10 and the ball nut (not illustrated) screwed on the ball screw 10.

The tool spindle unit 25 includes a tool headstock 26, a tool spindle 27 rotatably supported by the tool headstock 26, and a collet chuck 29 attached to the front end of the tool spindle 27. In FIG. 1, the tool spindle unit 25 is disposed above the axis of the workpiece spindle 17 at the right side of the workpiece spindle unit 15. The tool spindle unit 25 is arranged on the table 5 with the axis of the tool spindle 27 positioned in a plane which is parallel to an X-Z plane and includes the axis of the workpiece spindle 17 and with the collet chuck 29 positioned on the workpiece spindle unit 15 side and tilted to the right with respect to the X-axis.

As illustrated in FIG. 2, the tool spindle 27 has a through hole 27a that is formed along the axis of the tool spindle 27 in the center of the tool spindle 27. The rear end (the end located on the right side in FIG. 2) of the tool spindle 27 is connected to a ball joint 46, while the front end (the end located on the left side in FIG. 2) of the tool spindle 27 has the collect chuck 29 attached thereto. The collet chuck 29 holds a cup grindstone (hereinafter, simply referred to as "grindstone") T.

The grindstone T consists of a grindstone part $T_1$ and a shaft part $T_2$ holding the grindstone part $T_1$. The grindstone part $T_1$ has a formed concave surface $T_{1b}$ on a front end surface thereof, the concave surface $T_{1b}$ coming into contact with the spherical portion Wa of the workpiece W to grind the spherical portion Wa. The grindstone part $T_1$ and the shaft part $T_2$ respectively have through holes $T_{1a}$ and $T_2$ a formed in the center thereof. When the grindstone T is held by the collet chuck 29, the through holes $T_{1a}$ and $T_{2a}$ of the grindstone T communicate with the through hole 27a of the tool spindle 27.

Although omitted in FIG. 2, the tool headstock 26 has a tool spindle motor 28, which is illustrated in FIG. 3, incorporated therein. The tool spindle 27 rotates about the axis thereof by being driven by the tool spindle motor 28.

The coolant supply mechanism 40 consists of the rotary joint 41 connected to the rear end of the tool spindle 27, and a coolant supply 42 connected to the rotary joint 41 via an appropriate supply pipe 43.

The detection unit 35 consists of a base 36 disposed on the right side of the carriage 4 in FIG. 1 and fixed on the guide board 3, a support 37 fixed on the base 36 and arranged to have its longitudinal direction along the Z-axis and overhang the table 5, an air cylinder 38 fixed on the support 37 such that the axis of the air cylinder 38 is coaxial with the axis of the workpiece spindle 17 and the distal end of a piston rod 38a faces the workpiece spindle 17, and a detector 39 held on the distal end of the piston rod.

The detector 39 has a pair of arm-like styluses 39a configured to come into contact with the spherical portion Wa of the workpiece W in a manner to sandwich the spherical portion Wa from above and below. The styluses 39a detect the diameter of the spherical portion Wa by coming into contact with the spherical portion Wa. The detector 39 is used in a manner such that the styluses 39a come into contact with the spherical portion Wa of the workpiece W while the spherical portion Wa is being grinded. When the spherical portion Wa reaches a set diameter, the detector 39 outputs a detection signal, that is to say, a grinding completion signal. The thus-configured detector 39 is typically used in grinding and called "sizing device".

As illustrated in FIG. 3, the controller 50 is connected to the workpiece spindle motor 20, the tool spindle motor 28, the Z-axis drive motor 8, the X-axis drive motor 11, the detector 39, and the coolant supply 42 to control operations of the workpiece spindle motor 20, tool spindle motor 28, Z-axis drive motor 8, X-axis drive motor 11, and coolant supply 42. The controller 50 is composed of a computer including a CPU, a RAM, and a ROM. The controller 50 has a continuous machining control unit 51, a grinding control unit 52, and an information storage 53.

The continuous machining control unit 51 is a processing unit that totally controls a process of continuously grinding a plurality of workpieces W. For example, although not illustrated in FIG. 1, a material storage storing unmachined workpieces W therein, a product storage for storing machined workpieces W, and a loader functioning to attach a workpiece W stored in the material storage to the chuck 19 and to remove a machined workpiece W from the chuck 19 and store the workpiece W into the product storage are arranged around the machine tool 1, and the continuous machining control unit 51 executes a continuous operation by controlling the machine tool 1 as well as the material storage, the product storage, and the loader.

Figure 4:
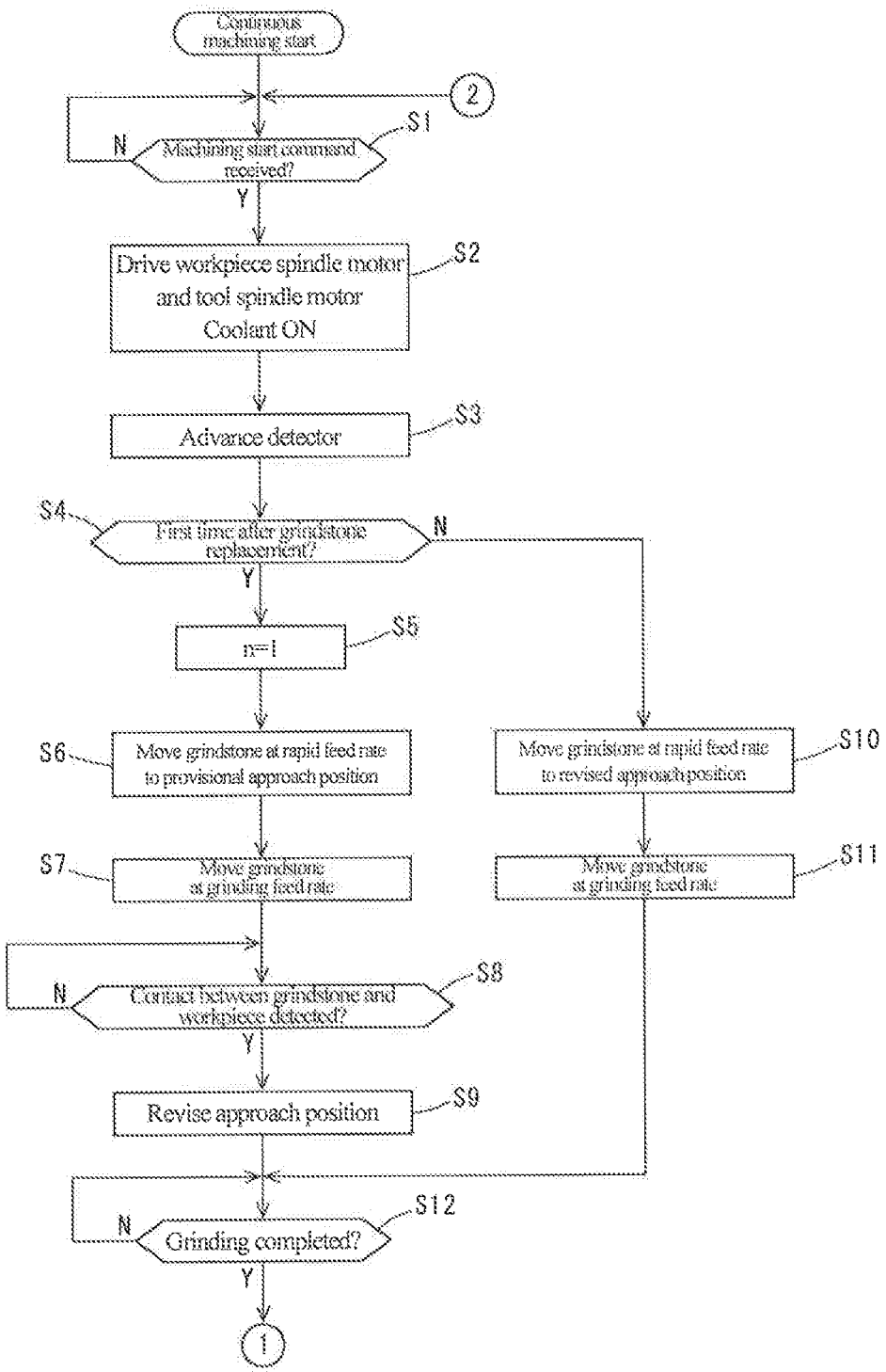
FIG. 4 is a flowchart illustrating a process in a controller in the embodiment.

The grinding control unit 52 is a processing unit that controls the machine tool 1 to machine the spherical portion Wa of the workpiece W. The grinding control unit 52 executes a process illustrated in FIGS. 4 and 5. Specifically, the grinding control unit 52 starts the process upon receipt of a continuous machining start command from the continuous machining control unit 51, and then waits until receiving a machining start command from the continuous machining control unit 51, that is to say, until an unmachined workpiece W becomes ready for grinding after being clamped by the chuck 19 (step S1).

Upon receipt of the machining start command, the grinding control unit 52 drives the workpiece spindle motor 20 to rotate the workpiece spindle 17, the chuck 19, and the workpiece W, drives the tool spindle motor 28 to rotate the tool spindle 27 and the grindstone T, and starts supply of coolant from the coolant supply 42 (step S2). Once the supply of coolant from the coolant supply 42 is started, coolant is supplied to the through hole 27a of the tool spindle 27 through the supply pipe 43 and the rotary joint 41. Thereafter, the coolant passes through the through hole 27a and then the through holes $T_{1a}$ and $T_{2a}$ of the grindstone T, after which the coolant is discharged through an opening formed in the concave surface $T_{1b}$.

Subsequently, the grinding control unit 52 drives the air cylinder 38 to advance the detector 39 toward the workpiece W and bring the pair of styluses 39a into contact with the spherical portion Wa of the workpiece W such that the spherical portion Wa is sandwiched by the pair of styluses 39 (step S3). Thereafter, the grinding control unit 52 verifies whether this machining is the first time after replacement for the grindstone T (step S4). Where it is the first time, the grinding control unit 52 sets a counter n to the initial value "1" (step S5), and then drives the X-axis drive motor 11 and the Z-axis drive motor 8 to move the carriage 4 and the table 5 at a rapid feed rate to move the grindstone T to a provisionally set approach position (hereinafter, referred to as "provisional approach position") (step S6).

The provisional approach position is a safe position which is sufficiently spaced away such that the grindstone T cannot come into contact with the workpiece W. The provisional approach position is set at a position such that the concave surface $T_{1b}$ of the grindstone T comes into contact with the spherical portion Wa of the workpiece W when the grindstone T is moved toward the spherical portion Wa along the axis of the tool spindle 27 from the position. The provisional approach position is previously set and stored in the information storage 53 of the controller 50. Information on whether the machining is the first time after replacement for the grindstone T is also stored in the information storage 53.

Subsequently, the grinding control unit 52 drives the X-axis drive motor 11 and the Z-axis drive motor 8 to move the grindstone T at a grinding feed rate along the axis of the tool spindle 27 through combined operation of the X-axis movement mechanism 9 and Z-axis movement mechanism 6 (step S7), and monitors the status of load of at least one of the X-axis drive motor 11, Z-axis drive motor 8, and workpiece spindle motor 20 to detect the concave surface $T_{1b}$ of the grindstone T coming into contact with the spherical portion Wa (step S8). That is to say, the loads on the X-axis drive motor 11, Z-axis drive motor 8, and workpiece spindle motor 20 are increased when the concave surface $T_{1b}$ of the grindstone T comes into contact with the spherical portion Wa. Therefore, monitoring any of these motors enables detection of the grindstone T coming into contact with the spherical portion Wa.

Once detecting the grindstone T coming into contact with the spherical portion Wa, the grinding control unit 52 revises, i.e., updates, the provisional approach position stored in the information storage 53 with a position which is reached by moving the grindstone T a predetermined distance away from the spherical portion Wa along the axis of the tool spindle 27 from the position at which the grindstone T is positioned at the time of detection (step S9). The approach position after this revision (hereinafter, referred to as "revised approach position") is a position which is shifted as much as possible to the spherical portion Wa side from the provisional approach position and at which the grindstone T cannot come into contact with the spherical portion Wa.

After the grindstone T comes into contact with the spherical portion Wa, the spherical portion Wa is grinded by the grindstone T. During the grinding, coolant is discharged through the opening in the concave surface $T_{1b}$ so that the coolant spreads all over the portion on which the grinding by the concave surface $T_{1b}$ is acting. Therefore, the cooling effect and the clogging prevention effect are sufficiently obtained. Note that, since, as described above, the tool spindle unit 25 is arranged with the axis of the tool spindle 27 tilted to the right with respect to the X-axis, the grindstone T is able to come into contact only with the spherical portion Wa when coming into contact with the spherical portion Wa and is prevented from interfering with the detector 39.

In the foregoing step S4, on the other hand, where it is verified that the machining is the second time or more after replacement for the grindstone T, the grinding control unit 52 drives the X-axis drive motor 11 and the Z-axis drive motor 8 to move the grindstone T at the rapid feed rate to the revised approach position (step S10), and then drives the X-axis drive motor 11 and the Z-axis drive motor 8 to move the grindstone T at the grinding feed rate along the axis of the tool spindle 27 through combined operation of the X-axis movement mechanism 9 and Z-axis movement mechanism 6 (step S11). Thereby, the concave surface $T_{1b}$ of the grindstone T is brought into contact with the spherical portion Wa and the spherical portion Wa is grinded in the same manner as described above. During the grinding, coolant is discharged through the opening in the concave surface $T_{1b}$ so that the coolant spreads all over the portion on which the grinding by the concave surface $T_{1b}$ is acting. Therefore, the cooling effect and the clogging prevention effect are sufficiently obtained.

After the grinding is started in the step S7 or in the step S11, the grinding control unit 52 monitors whether the grinding completion signal is output from the detector 39 (step S12). Upon receipt of the grinding completion signal, the grinding control unit 52 stops the grinding feed of the grindstone T (step S13), and updates the counter n (step S14) and stores the then position of the grindstone T into the information storage 53 (step S15). Thereafter, the grinding control unit 52 drives the X-axis drive motor 11 and the Z-axis drive motor 8 to return the grindstone T at the rapid feed rate to its home position and drives the air cylinder 38 to retract the detector 39 to its home position (step S16).

Subsequently, the grinding control unit 52 stops the workpiece spindle motor 20 and the tool spindle motor 28 and stops the supply of coolant from the coolant supply 42 (step S17). Thereafter, the grinding control unit 52 compares the position of the grindstone T at the time of grinding completion (grinding completion position) detected in the step S15 with the grinding completion position detected in the first-time machining to calculate an amount of variation between them. On the basis of whether the calculated amount of variation exceeds a predetermined amount, the grinding control unit 52 makes a judgment on the life of the grindstone T (step S18). This amount of variation is equivalent to an amount of wear of the grindstone T. When the amount of variation, i.e., the amount of wear exceeds a predetermined limit amount, the grinding control unit 52 judges that the grindstone T has reached the end of its life, and notifies the outside of the need to replace the grindstone T (step S20).

When the amount of variation does not exceed the predetermined amount, the grinding control unit 52 judges whether the counter n, that is to say, the number of times of grinding using the grindstone T has reached a preset limit number of times m (step S19). When it has reached the limit number of times, the grinding control unit 52 notifies the outside of the need to replace the grindstone T (step S20). As described above, when the amount of wear of the grindstone T exceeds the predetermined amount, the grindstone T can be judged to have reached the end of its life and the grindstone T therefore needs to be replaced. However, the amount of wear is not the only criterion for replacement of the grindstone T. When the number of times of grinding has reached the preset limit number of times m, the surface accuracy of the machined surface cannot satisfy a predetermined level. Therefore, the number of times of grinding also can be used as a criterion for replacement of the grindstone T. In this embodiment, the grindstone T is to be replaced when either the amount of wear of the grindstone T or the number of times of grinding for the grindstone T exceeds its reference value, which enables more appropriate replacement of the grindstone T and consequently enables the accuracy in machining the workpieces W to be suitably maintained.

The grinding control unit 52 repeats the above-described steps S1 through S20 until receiving a machining finish signal from the continuous machining control unit 51. Upon receipt of the machining finish signal, the grinding control unit 52 finishes the process (step S21).

In the machine tool according to this embodiment having the above-described configuration, the spherical portion Wa of the workpiece W is grinded in the manner described below under control by the controller 50.

That is to say, the grinding control unit 52 starts the process upon receipt of the continuous machining start command from the continuous machining control unit 51. Thereafter, upon receipt of the machining start command from the continuous machining control unit 51, the grinding control unit 52 drives the workpiece spindle motor 20 to rotate the workpiece W, drives the tool spindle motor 28 to rotate the grindstone T, and starts supply of coolant from the coolant supply 42 (step S2). Further, the grinding control unit 52 drives the air cylinder 38 to advance the detector 39 toward the workpiece W by and bring the pair of styluses 39a into contact with the spherical portion Wa (step S3).

Subsequently, the grinding control unit 52 verifies whether the machining is the first time after replacement for the grindstone T (step S4). When it is the first time, the grinding control unit 52 moves the grindstone T at the rapid feed rate to the provisional approach position (step S6), and then moves the grindstone T at the grinding feed rate along the axis of the tool spindle 27 (step S7). On the other hand, when the machining is the second time or more, the grinding control unit 52 moves the grindstone T at the rapid feed rate to the revised approach position (step S10), and then moves the grindstone T at the grinding feed rate along the axis of the tool spindle 27 (step S7).

When using a new grindstone T, the position of the concave surface $T_{1b}$ of the grindstone T is not accurately recognized. Therefore, in the first-time machining, the grindstone T is moved at the rapid feed rate to a safe position (provisional approach position) which is sufficiently spaced away such that the grindstone T cannot come into contact with the spherical portion Wa of the workpiece W, which ensures that the grindstone T is prevented from colliding with the workpiece W.

The provisional approach position is thereafter revised on the basis of the contact position between the grindstone T and the workpiece W detected in the first-time machining. Thereafter, in and after the second-time machining, the grindstone T is moved at the rapid feed rate to and positioned at the revised approach position. The revised approach position is a position which is shifted as much as possible to the spherical portion Wa side from the provisional approach position and at which the grindstone T cannot come into contact with the spherical portion Wa. Therefore, in and after the second-time machining, positioning the grindstone T at the revised approach position enables the grinding to be performed efficiently in a shorter machining time.

After the grindstone T is moved at the rapid feed rate to and positioned at the approach position in the above-described manner, the grindstone T is moved at the grinding feed rate along the axis of the tool spindle 27. Thereby, the spherical portion Wa of the workpiece W is brought into contact with the concave surface $T_{1b}$ as the grinding acting surface of the grindstone T and the spherical portion Wa is grinded. During the grinding, coolant is discharged through the opening formed in the concave surface $T_{1b}$ so that the coolant spreads all over the portion on which the grinding by the concave surface $T_{1b}$ is acting. Therefore, the cooling effect and the clogging prevention effect are sufficiently obtained so that preferable grinding is carried out.

Once the detector 39 detects the spherical portion Wa reaching a predetermined dimension (step S12), the grinding is finished (steps S13 through S17) and a judgment is made on the life of the grindstone T (step S18). When the grindstone T has reached the end of its life or when the number of times of grinding using the grindstone T has reached the limit number of times m (step S19), a notification of the need to replace the grindstone T is made to the outside (Step S20). Thus, since a notification is made to the outside when the grindstone T needs to be replaced, it is possible to replace the grindstone T at an appropriate time, and consequently the accuracy in machining the workpieces W is suitably maintained.

Further, as described above, the machine tool 1 according to this embodiment is configured by combining the typical general-purpose NC machine tool components, namely, the bed 2, the guide board 3, the workpiece spindle unit 15, the carriage 4, the table 5, the Z-axis movement mechanism 6, and the X-axis movement mechanism 9 with the tool spindle unit 25, the detection unit 35, and the coolant supply mechanism 40 and providing the grinding control unit 52 in the controller 50. Therefore, this machine tool 1 can be produced at a low cost; consequently, even when the product to be machined (workpiece W) is small in production quantity, the equipment cost to order volume can be suppressed and the product can therefore be manufactured at an appropriate cost.

Hereinbefore, a specific embodiment of the present invention has been described. However, the present invention is not limited to the above-described embodiment and can be implemented in other manners.

For example, the above-described embodiment uses the detector 39 having the pair of arm-like styluses 39a; however, the present invention is not limited to such a detector. A detector having a single stylus 39a coming into contact with the spherical portion Wa may be used instead. Such a detector is also able to detect the spherical portion Wa reaching a predetermined dimension.

Further, in the above-described embodiment, the workpiece headstock 16 and the workpiece spindle motor 20 are provided separately; however, the present invention is not limited to such a configuration and a configuration is possible in which the workpiece spindle motor 20 is incorporated in the workpiece headstock 16.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within the scope equivalent to the scope of the claims.

REFERENCE SIGNS LIST

1 Machine tool
2 Bed
3 Guide board
4 Carriage
5 Table
6 Z-axis movement mechanism
7 Ball screw
8 Z-axis drive motor
9 X-axis movement mechanism
10 Ball screw
15 X-axis drive motor
16 Workpiece spindle unit
17 Workpiece headstock
18 Workpiece spindle
19 Chuck
20 Workpiece spindle motor
25 Tool spindle unit
26 Tool headstock
27 Tool spindle
28 Tool spindle motor
35 Detection unit
39 Detector
40 Coolant supply mechanism
41 Rotary joint
42 Coolant supply
50 Controller
51 Continuous machining control unit
52 Grinding control unit
53 Information storage

The invention claimed is:
1. A machine tool comprising:
a workpiece spindle unit including a workpiece spindle and a workpiece spindle motor, the workpiece spindle being rotatably held and configured to hold a workpiece, the workpiece spindle motor being configured to rotate the workpiece spindle;
a tool spindle unit including a tool spindle and a tool spindle motor, the tool spindle being rotatably held and configured to hold a cup grindstone having a concave surface, the tool spindle motor being configured to rotate the tool spindle;
a first-axis movement mechanism configured to move the tool spindle unit relative to the workpiece spindle unit in a direction of a first axis that extends along an axis of the workpiece spindle;
a second-axis movement mechanism configured to move the tool spindle unit relative to the workpiece spindle unit in a direction of a second axis that is perpendicular to the first axis, wherein the tool spindle unit is arranged with an axis of the tool spindle positioned in a plane that is parallel to a plane formed by the first axis and the second axis and that includes the axis of the workpiece spindle; and
a controller configured to control the workpiece spindle motor, the tool spindle motor, the first-axis movement mechanism, and the second-axis movement mechanism,
the first-axis movement mechanism including a first-axis drive motor,
the second-axis movement mechanism including a second-axis drive motor,
the tool spindle unit being arranged such that the axis of the tool spindle is tilted with respect to the first axis and intersects the axis of the workpiece spindle,
the controller being configured to drive the first-axis movement mechanism and the second-axis movement mechanism to move the tool spindle unit relative to the workpiece spindle unit along the axis of the tool spindle through combined operation of the first-axis movement mechanism and second-axis movement mechanism, thereby bringing the concave surface of the cup grindstone held by the tool spindle into contact with a spherical portion of the workpiece held by the workpiece spindle to grind the spherical portion of the workpiece.

2. The machine tool according to claim 1, wherein:
the controller is configured to drive at least one of the first-axis movement mechanism and second-axis movement mechanism to move the tool spindle unit relative to the workpiece spindle unit at a faster feed rate than a grinding feed rate set for grinding such that the cup grindstone is positioned at an approach position set at a position prior to the concave surface of the cup grindstone coming into contact with the workpiece, and then drive both the first-axis movement mechanism and the second-axis movement mechanism to move the tool spindle unit relative to the workpiece spindle unit at the grinding feed rate set for grinding; and
the controller is further configured to monitor a load on at least one of the workpiece spindle motor, tool spindle motor, first-axis drive motor, and second-axis drive motor to detect the cup grindstone coming into contact with the workpiece and configured to revise the approach position to a position which is located prior to and spaced a preset distance from a detected contact position between the cup grindstone and the workpiece.

3. The machine tool according to claim 2, wherein:
the machine tool comprises a detector configured to detect an outer diameter of the workpiece reaching a predetermined dimension during grinding of the workpiece;
the controller is configured to finish the grinding when the detector detects the outer diameter of the workpiece reaching the predetermined dimension and configured to store as a machining completion position a relative positional relation between the cup grindstone and the workpiece at time of detection; and
the controller is further configured to, in machining a plurality of workpieces with the cup grindstone, compare a machining completion position obtained in machining of a current workpiece with a machining completion position obtained in machining of an initial workpiece, and when an amount of variation between the machining completion positions exceeds a predetermined limit amount, judge that the cup grindstone has reached an end of its life and make a notification to outside.

4. The machine tool according to claim 3, wherein:
the cup grindstone has a through hole formed to penetrate the cup grindstone along an axis of the cup grindstone;
the tool spindle has a supply hole communicating with the through hole of the cup grindstone held by the tool spindle; and
the machine tool further comprises a coolant supply mechanism configured to supply coolant to the supply hole of the tool spindle to discharge the coolant through an opening of the through hole formed in the cup grindstone.

5. The machine tool according to claim 2, wherein:
the cup grindstone has a through hole formed to penetrate the cup grindstone along an axis of the cup grindstone;
the tool spindle has a supply hole communicating with the through hole of the cup grindstone held by the tool spindle; and
the machine tool further comprises a coolant supply mechanism configured to supply coolant to the supply hole of the tool spindle to discharge the coolant through an opening of the through hole formed in the cup grindstone.

6. The machine tool according to claim 1, wherein:
the machine tool comprises a detector configured to detect an outer diameter of the workpiece reaching a predetermined dimension during grinding of the workpiece;
the controller is configured to finish the grinding when the detector detects the outer diameter of the workpiece reaching the predetermined dimension and configured to store as a machining completion position a relative positional relation between the cup grindstone and the workpiece at time of detection; and
the controller is further configured to, in machining a plurality of workpieces with the cup grindstone, compare a machining completion position obtained in machining of a current workpiece with a machining completion position obtained in machining of an initial workpiece, and when an amount of variation between the machining completion positions exceeds a predetermined limit amount, judge that the cup grindstone has reached an end of its life and make a notification to outside.

7. The machine tool according to claim 6, wherein:
the cup grindstone has a through hole formed to penetrate the cup grindstone along an axis of the cup grindstone;
the tool spindle has a supply hole communicating with the through hole of the cup grindstone held by the tool spindle; and
the machine tool further comprises a coolant supply mechanism configured to supply coolant to the supply hole of the tool spindle to discharge the coolant through an opening of the through hole formed in the cup grindstone.

8. The machine tool according to claim 1, wherein:
the cup grindstone has a through hole formed to penetrate the cup grindstone along an axis of the cup grindstone;
the tool spindle has a supply hole communicating with the through hole of the cup grindstone held by the tool spindle; and
the machine tool further comprises a coolant supply mechanism configured to supply coolant to the supply hole of the tool spindle to discharge the coolant through an opening of the through hole formed in the cup grindstone.

9. A machine tool comprising:
a workpiece spindle unit including a workpiece spindle and a workpiece spindle motor, the workpiece spindle being rotatably held and configured to hold a workpiece, the workpiece spindle motor being configured to rotate the workpiece spindle;
a tool spindle unit including a tool spindle and a tool spindle motor, the tool spindle being rotatably held and configured to hold a cup grindstone having a concave surface, the tool spindle motor being configured to rotate the tool spindle;
a first-axis movement mechanism configured to move the tool spindle unit relative to the workpiece spindle unit in a direction of a first axis that extends along an axis of the workpiece spindle;
a second-axis movement mechanism configured to move the tool spindle unit relative to the workpiece spindle unit in a direction of a second axis that is perpendicular to the first axis, wherein the tool spindle unit is arranged with an axis of the tool spindle positioned in a plane that is parallel to a plane formed by the first axis and the second axis and that includes the axis of the workpiece spindle;

a detector configured to detect an outer diameter of the workpiece reaching a predetermined dimension during grinding of the workpiece; and a controller configured to control the workpiece spindle motor, the tool spindle motor, the first-axis movement mechanism, and the second-axis movement mechanism, the first-axis movement mechanism including a first-axis drive motor, the second-axis movement mechanism including a second-axis drive motor, the tool spindle unit being arranged such that the axis of the tool spindle intersects the axis of the workpiece spindle, the controller being configured to drive the first-axis movement mechanism and the second-axis movement mechanism to relatively move the workpiece spindle unit and the tool spindle unit along the axis of the tool spindle through combined operation of the first-axis movement mechanism and second-axis movement mechanism, thereby grinding the workpiece held by the workpiece spindle with the cup grindstone held by the tool spindle;

the controller being configured to finish the grinding when the detector detects the outer diameter of the workpiece reaching the predetermined dimension and configured to store as a machining completion position a relative positional relation between the cup grindstone and the workpiece at time of detection; and the controller being configured to, in machining a plurality of workpieces with the cup grindstone, compare a machining completion position obtained in machining of a current workpiece with a machining completion position obtained in machining of an initial workpiece, and when an amount of variation between the machining completion positions exceeds a predetermined limit amount, judge that the cup grindstone has reached an end of its life and make a notification to outside.

* * * * *